(12) United States Patent  (10) Patent No.: US 8,571,998 B2
Zhu et al.  (45) Date of Patent: *Oct. 29, 2013

(54) COMPATIBILITY SCORING OF USERS

(75) Inventors: Xiao Ming Zhu, San Jose, CA (US); Christopher Lunt, Mountain View, CA (US)

(73) Assignee: Facebook Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,641

(22) Filed: Mar. 28, 2012

(65) Prior Publication Data

US 2012/0185539 A1  Jul. 19, 2012

Related U.S. Application Data

(60) Continuation of application No. 12/242,562, filed on Sep. 30, 2008, now Pat. No. 8,150,778, which is a division of application No. 11/117,793, filed on Apr. 28, 2005, now Pat. No. 7,451,161.

(51) Int. Cl.
| G06Q 30/02 | (2012.01) |
| G06Q 10/10 | (2012.01) |
| G06Q 10/06 | (2012.01) |
| G06Q 40/02 | (2012.01) |
| G06Q 99/00 | (2006.01) |

(52) U.S. Cl.
USPC ........................................................ 705/319

(58) Field of Classification Search
USPC .................................................. 705/1.1, 319
See application file for complete search history.

(56) References Cited

U.S. PATENT DOCUMENTS

| 5,754,939 | A | 5/1998 | Herz |
| 6,112,186 | A | 8/2000 | Bergh |
| 6,839,680 | B1 | 1/2005 | Liu |
| 2002/0160339 | A1* | 10/2002 | King et al. .................... 434/106 |
| 2002/0178163 | A1 | 11/2002 | Mayer |
| 2004/0215793 | A1 | 10/2004 | Ryan |

(Continued)

FOREIGN PATENT DOCUMENTS

| EP | 1 065 607 | 1/2001 |
| JP | 2003 093745 | 4/2006 |
| WO | 01/20481 | 3/2001 |
| WO | WO 01/20481 | 3/2001 |

OTHER PUBLICATIONS

Notice of Rejection and English Translation for JP 2008-509097, Nov. 2, 2010.

(Continued)

*Primary Examiner* — Jonathan Ouellette
(74) *Attorney, Agent, or Firm* — Baker Botts L.L.P.

(57) ABSTRACT

The compatibility score of members of a social network is based on the compatibility of their expressed interests. The compatibility score between any two interests is calculated as the log of the estimated probability that a member of the social network will express both interests divided by the product of: (i) the estimated probability that a member of the social network will express the first of the two interests and (ii) the estimated probability that a member of the social network will express the second of the two interests. The compatibility score between two individuals is calculated as the sum of the compatibility scores between each interest appearing in a set of interests expressed by the first of the two individuals and each interest appearing in a set of interests expressed by the second of the two individuals.

22 Claims, 9 Drawing Sheets

(56) References Cited

U.S. PATENT DOCUMENTS

2004/0260781 A1    12/2004  Shostack
2006/0059159 A1    3/2006   Truong
2009/0024548 A1    1/2009   Zhu
2010/0185580 A1    7/2010   Zhu

OTHER PUBLICATIONS

Notice of Final Rejection for Korean Patent Application No. 2007-702777, Jun. 1, 2010.
O'Mahony et al., "An Evaluation of Neighbourhood Formation on the Performance of Collaborative Filtering," Department of Computer Science, University College Dublin, Artificial Intelligence Review 21: pp. 215-228, 2004.
Office Action for U.S. Appl. No. 11/117,793, Nov. 15, 2007.
Office Action for U.S. Appl. No. 11/117,793, May 30, 2008.
Office Action for U.S. Appl. No. 12/242,562, Jul. 13, 2011.
Office Action for U.S. Appl. No. 12/748,145, Aug. 18, 2011.
Office Action for U.S. Appl. No. 12/748,145, Apr. 4, 2012.
Office Action for U.S. Appl. No. 12/748,145, Apr. 11, 2013.
Office Action and English Translation for Chinese Patent Application No. 2006800207119, Jun. 23, 2010.
Office Action and English Translation for Chinese Patent Application No. CN 20068002071.9, May 30, 2011.
Office Action for Indian Patent Application 5461/CHENP/2007, Jul. 29, 2011.
Search Report for EP 06 75 8645, Feb. 23, 2010.
Search Report for International Application PCT/US06/15908, Jan. 17, 2008.
SIPO Decision of Rejection for Chinese Patent Application 200680020711.9, Mar. 21, 2012.
Examination Report for Indian Patent Application 5461/CHENP/2007, Jul. 5, 2012.
Summons to Attend Oral Proceedings for EP No. 06758645.3-1527, Jul. 20, 2012.
Brief Communication from European Patent Office re: EP No. 06758645.3-1527, Nov. 27, 2012.

* cited by examiner

FIG. 7

Keyword:
| Hometown ▼ |   |

Ages: [18] to [30]

People who are:
| Men & Women ▼ |

Country:
| UNITED STATES ▼ |

Proximity:
| Within 50 miles of ▼ |

Zip or City, State:
| |

Show Profiles Within:
| Three Degrees ▼ |

Show:
☐ Profiles with Photos Only
| Photos & Info ▼ |

[ Search ]  710

He/She is interested in:
☐ All
☐ Dating Men
☐ Dating Women
☐ Relationship Men
☐ Relationship Women
☐ Friends
☐ Activity Partners
☐ Just Looking Around Relationship Status:
☐ Any
☐ Single
☐ In a Relationship
☐ Domestic Partnership
☐ Married
☐ Unknown Status

| Search Results | | Sort by: d/s <u>score</u> proximity | |
|---|---|---|---|
| Rank | Photo | Member | Score |
| 1 | Photo | <u>User D</u><br>*Mini-profile* | 14.11 |
| 2 | Photo | <u>User B</u><br>*Mini-profile* | 13.05 |
| 3 | Photo | <u>User S</u><br>*Mini-profile* | 11.19 |
| 4 | Photo | <u>User G</u><br>*Mini-profile* | 10.01 |

800

COMPATIBILITY SCORING OF USERS

RELATED APPLICATIONS

The present application is a continuation of U.S. patent application Ser. No. 12/242,562, filed Sep. 30, 2008, and entitled "Compatibility Scoring of Users in a Social Network," which is a divisional of U.S. patent application Ser. No. 11/117,793, filed Apr. 28, 2005, and entitled "Compatibility Scoring of Users in a Social Network."

BACKGROUND

The present invention generally relates to processing of social network data, and more particularly, to a method for scoring compatibility between members of an online social network.

Several online dating and friend-making sites currently operate on the Internet. These services are generally similar in function. They allow users to post profiles and photos, as well as search through the profiles and photos of other users. Communication between users is provided anonymously, since users are identified by pseudonyms.

Initially, these sites implemented rudimentary techniques to match users. These techniques amounted to no more than user profile searches based on criteria such as age, gender, location, and physical characteristics. More recently, these sites have implemented more sophisticated processes in an effort to find better matches for their users. These processes attempt to assess an individual's personality based on specially designed tests or questionnaires and find users who have compatible personalities.

INTRODUCTION

The present invention bases compatibility of two individuals who are members of a social network on the compatibility of interests expressed by these individuals, and provides for methods for quantifying compatibility of interests, scoring compatibility of the two individuals in accordance with compatibility of interests expressed by these individuals, and presenting compatibility results that include the compatibility scores.

The method of quantifying compatibility of interests includes the steps of calculating an estimated probability associated with each interest (referred to herein as "interest probability") and each pair of interests (referred to herein as "joint probability"), and assigning an interest compatibility score between each pair of interests based on the estimated probabilities. The estimated interest probability for a particular interest represents the probability that a member of the social network will express that interest as one of his or her interests. The estimated joint probability for a particular pair of interests represents the probability that a member of the social network will express both interests in the pair as his or her interests.

In accordance with one embodiment of the present invention, the interest compatibility score between each pair of interests is computed as a function of the estimated joint probability for the pair, and the estimated interest probabilities for the first and second interests of the pair.

The method of scoring compatibility in accordance with compatibility of interests includes the steps of preparing interest compatibility scores based on expressed interests of the members of the social network, and computing a compatibility score between a first member of the social network and a second member of the social network based on expressed interests of the first member, expressed interests of the second member, and the interest compatibility scores between the expressed interests of the first member and the expressed interests of the second member. The interest compatibility score for any two expressed interests represents the degree of compatibility between the two expressed interests.

The method of presenting compatibility results that include the compatibility scores, e.g., to an individual in the social network, includes the steps of preparing interest compatibility scores based on expressed interests of the individuals in the social network, selecting a set of individuals who are within a predetermined degree of separation from the first individual, and computing a compatibility score between the first individual and each of the individuals in the set. If the predetermined degree of separation is set as one, this means that only the compatibility scores of the first individual's direct friends will be presented. The compatibility results that include the compatibility scores are presented as a web page and before the web page is transmitted to be displayed, the compatibility results are sorted in the order of the compatibility scores. By providing compatibility scores and linking it to interest profiles, the invention encourages people to enter interests so the site can find other people who share the same or compatible interests.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 is a sample GUI used to specify member search criteria;

FIG. 8 is a sample member search results page containing compatibility scores.

DESCRIPTION OF PARTICULAR EMBODIMENT(S)

Figure 1:
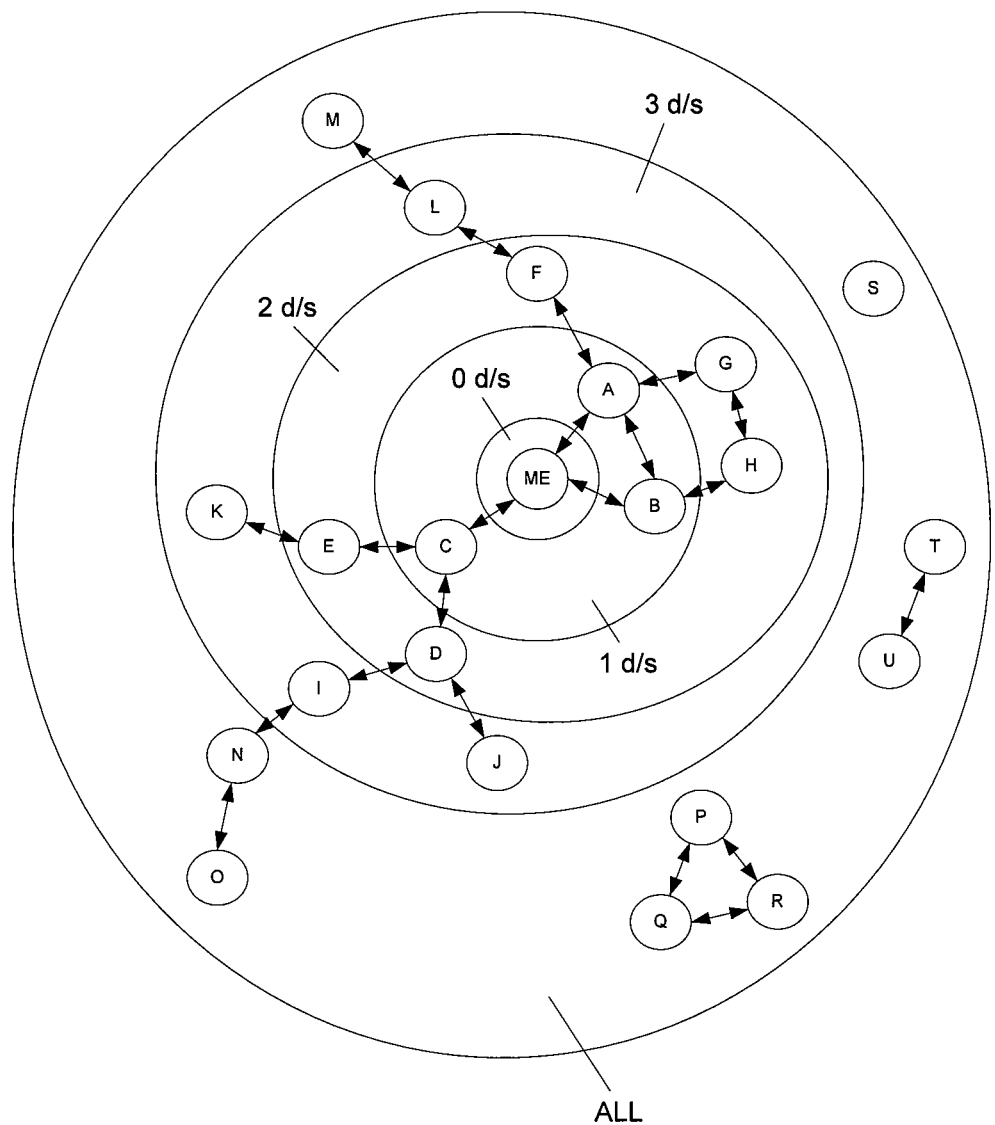
FIG. 1 is a diagram that graphically represents the relationships between members in a social network.

FIG. 1 is a graph representation of a social network centered on a given individual (ME). Other members of this social network include A-U whose position, relative to ME's, is referred to by the degree of separation between ME and each other member. Friends of ME, which includes A, B, and C, are separated from ME by one degree of separation (1 d/s). A friend of a friend of ME is separated from ME by 2 d/s. As shown, D, E, F, G, and H are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
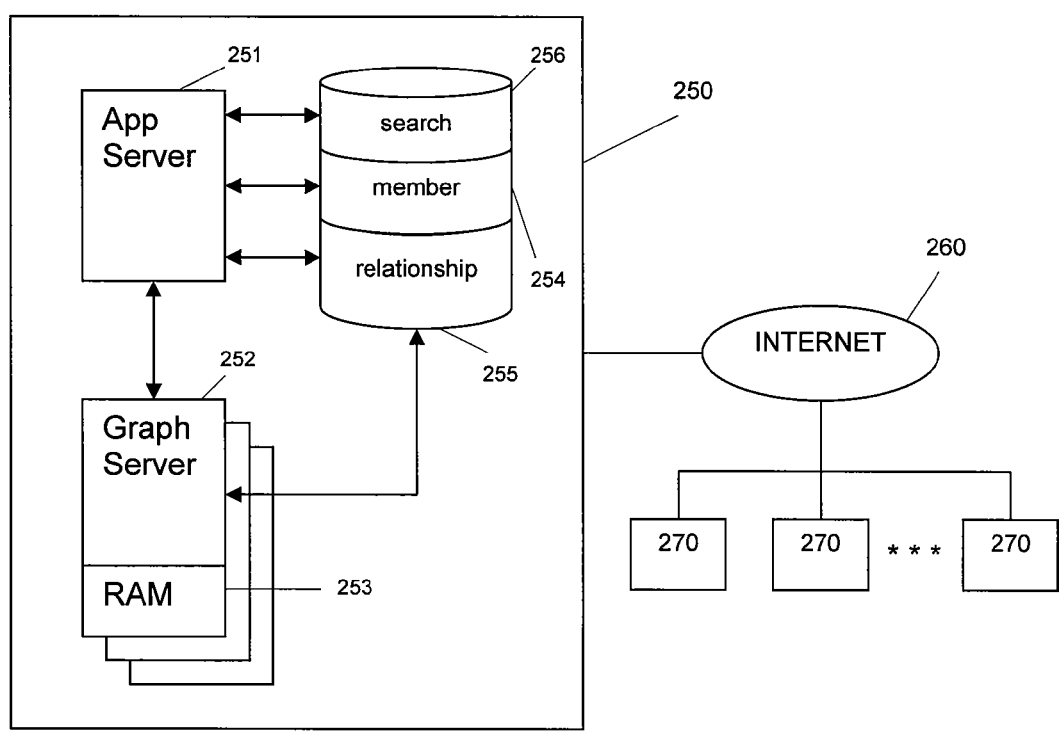
FIG. 2 is a block diagram illustrating components of a system for managing an online social network.

FIG. 2 is a block diagram illustrating a system for creating and managing an online social network. As shown, FIG. 2 illustrates a system 250 that includes an application server 251 and one or more graph servers 252. The system 250 is connected to a network 260, e.g., the Internet, and accessible over the network by a plurality of computers, collectively designated as 270. The application server 250 manages a member database 254, a relationship database 255, and a search database 256. The member database 254 contains profile information for each of the members in the online social network managed by the system 250. The profile information may include, among other things: a unique member identifier, name, age, gender, location, hometown, references to image files, listing of interests, attributes, and the like. The relationship database 255 stores information defining to the first degree relationships between members. In addition, the contents of the member database 254 are indexed and optimized for search, and stored in the search database 256. The member database 254, the relationship database 255, and the search database 256 are updated to reflect inputs of new member information and edits of existing member information that are made through the computers 270.

The application server 250 also manages the information exchange requests that it receives from the remote computers 270. The graph servers 252 receive a query from the application server 251, process the query and return the query results to the application server 252. The graph servers 252 manage a representation of the social network for all the members in the member database. The graph servers 252 have a dedicated memory device 253, such as a random access memory (RAM), in which an adjacency list that indicates all first degree relationships in the social network is stored. The graph servers 252 respond to requests from application server 251 to identify relationships and the degree of separation between members of the online social network.

Figure 3:
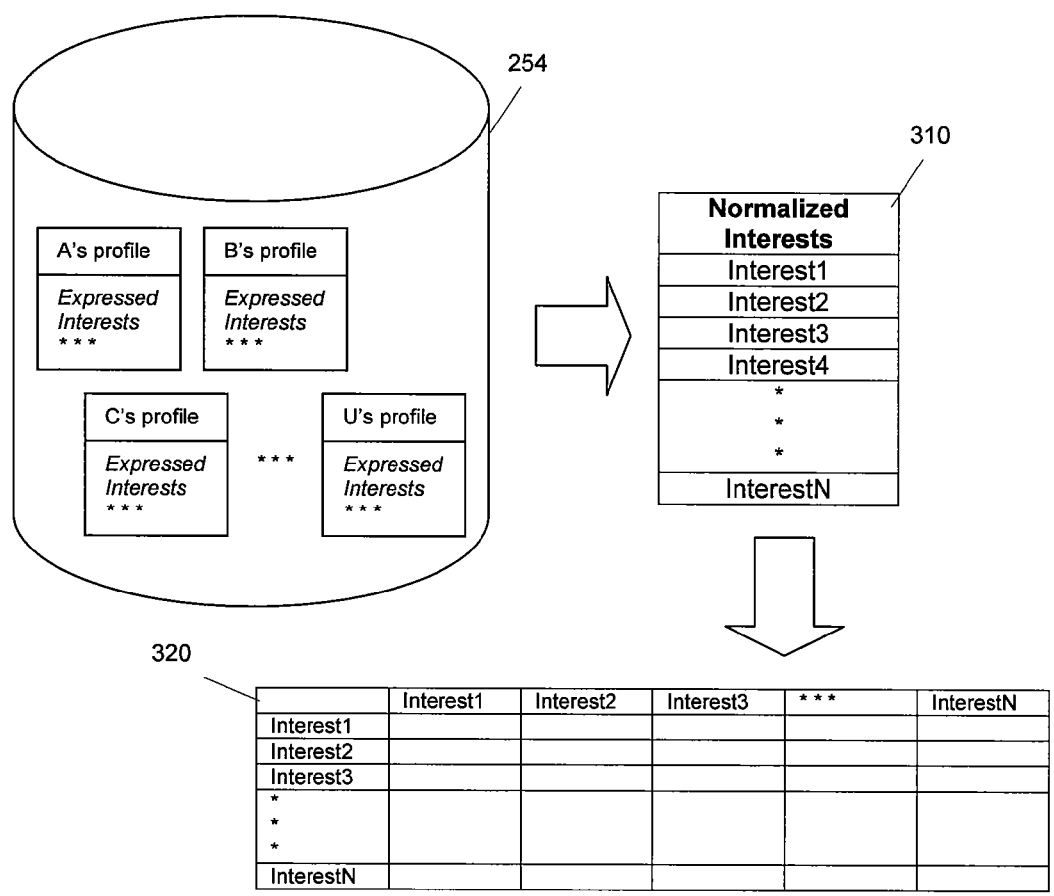
FIG. 3 schematically illustrates the process for computing interest compatibility data from a member database containing interest data.

FIG. 3 illustrates the member database 254 in additional detail and shows that the interest data stored therein is first converted into a set 310 of normalized interests and then to a matrix 320 of interest compatibility scores. The conversion into normalized interests and then to interest compatibility scores is performed by a processing unit of the application server 251.

The interest normalization process is in essence an interest classification process. It is performed so that the same interest expressed in different ways will be classified under that same interest. For example, an interest expressed as reading may be classified under the same normalized interest as an interest expressed as books. In the set 310 of normalized interests shown in FIG. 3, the normalized interests are shown as a list. In an alternative embodiment, the normalized interests may be arranged as a hierarchical tree. Further, the present invention may be applied to systems where members input interests by selecting one or more interests that have been pre-defined by the system operator. In such a case, the normalization step is not performed and the set of pre-defined interests is used as the set 310 of normalized interests.

The matrix 320 of interest compatibility scores provides numerical scores that represent how compatible each pair of normalized interests, Interest1, Interest2, . . . , InterestN, is. Each off-diagonal cell in the matrix 320 has a numerical score entry that indicates the compatibility of the two interests associated with that cell's row and column. Each diagonal cell in the matrix 320 has a numerical score entry that is a measure of the rarity of the interests associated with that cell's row and column. A rare interest has a high score. A commonly occurring interest has a low score. In the embodiment of the present invention illustrated herein, the interest compatibility scores are compiled automatically based on the expressed interests of the members that have been normalized. The interest compatibility scores can also be manually created or they can be created using a combination of automatic and manual processes. Further, any of the interest compatibility scores that are compiled automatically may be manually adjusted.

Figure 4:
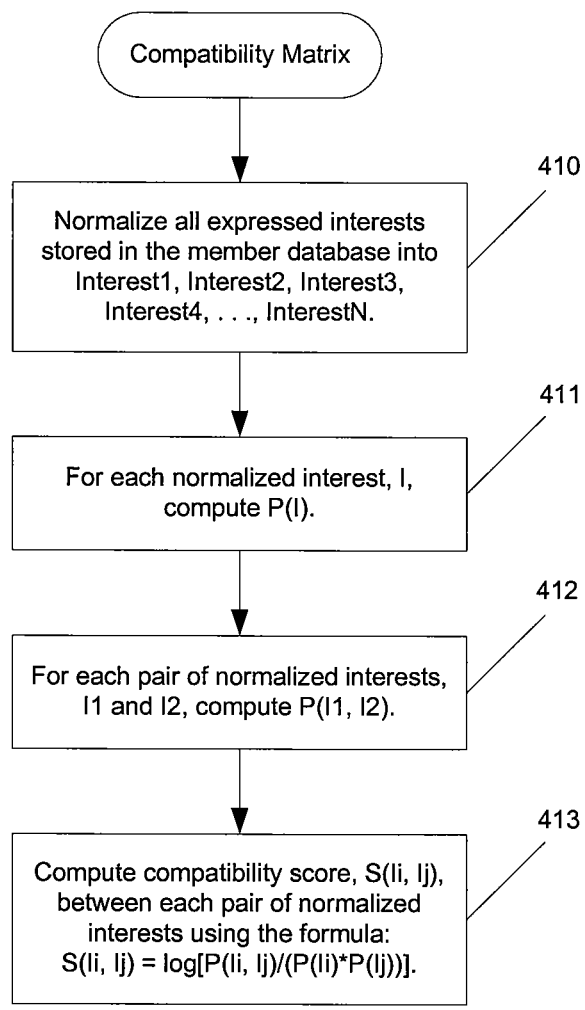
FIG. 4 is a flow diagram illustrating the process steps for computing interest compatibility data from a member database containing interest data.

FIG. 4 is a flow diagram that illustrates the process steps involved in generating the matrix 320. In Step 410, all expressed interests stored in the member database 254 are normalized into the set 310 of normalized interests, Interest1, Interest2, InterestN. A standard data mining methodology known as clustering can be used in Step 410. For each normalized interest, I, the probability, P(I), is calculated (Step 411). P(I) represents the probability that a member will express an interest that corresponds to the normalized interest, I, and is calculated using the expressed interests stored in the member database 254 according to the formula: P(I)= (number of times an interest corresponding to the normalized interest, I, is expressed in the member database 254)/(total number of expressed interests in the member database 254). For each pair of normalized interests, I1 and I2, the probability, P(I1, I2), is calculated (Step 412). P(I1, I2) represents the probability that a member will express interests that correspond to the normalized interests, I1 and I2, and is calculated using the expressed interests stored in the member database 254 according to the formula: P(I1, I2)=(number of members who expressed interests corresponding to both of the normalized interests, I1 and I2, in the member database 254)/(total number of expressed interests in the member database 254). In cases where I1=I2, P(I1, I2) is set to P(I1) or P(I2). In Step 413, an interest compatibility score, S(Ii, Ij), is calculated between each pair of normalized interests using the formula: S(Ii, Ij)=log [P(Ii, Ij)/(P(Ii)*P(Ij))]. Because of the division by [P(Ii)*P(Ij)], using this formula, the commonality of rare interests are rated higher than commonality in more popular interests.

Figure 5:
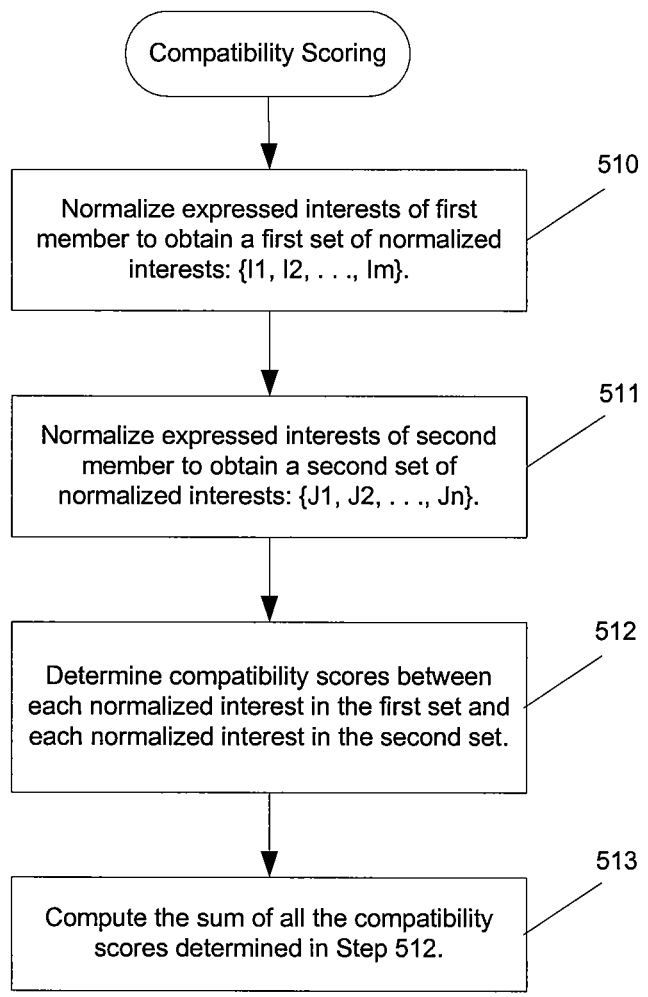
FIG. 5 is a flow diagram illustrating the process steps for computing a compatibility score between two members of a social network according to an embodiment of the present invention.

FIG. 5 is a flow diagram that illustrates the process steps executed by the processor of the application server 251 in computing a compatibility score between two members, e.g., a first member and a second member. In Step 510, the expressed interests of the first member are normalized into a first set {I1, I2, . . . , Im} of normalized interests, where m represents the number of normalized interests in the first set. In Step 511, the expressed interests of the second member are normalized into a second set {J1, J2, . . . , Jn} of normalized interests, where n represents the number of normalized interests in the second set. In Step 512, the interest compatibility scores for all pairs of normalized interests in the first and second sets are determined from the matrix 320. For example, if the first set is {Interest_1, Interest_2} and the second set is {Interest_2, Interest_3}, the following compatibility scores are retrieved from the matrix 320:

Compatibility(Interest_1, Interest_2);
Compatibility(Interest_1, Interest_3);
Compatibility(Interest_2, Interest_2); and
Compatibility(Interest_2, Interest_3).

In Step 513, the compatibility scores determined in Step 512 are summed, and the sum represents the compatibility score between the first member and the second member.

Figure 6:
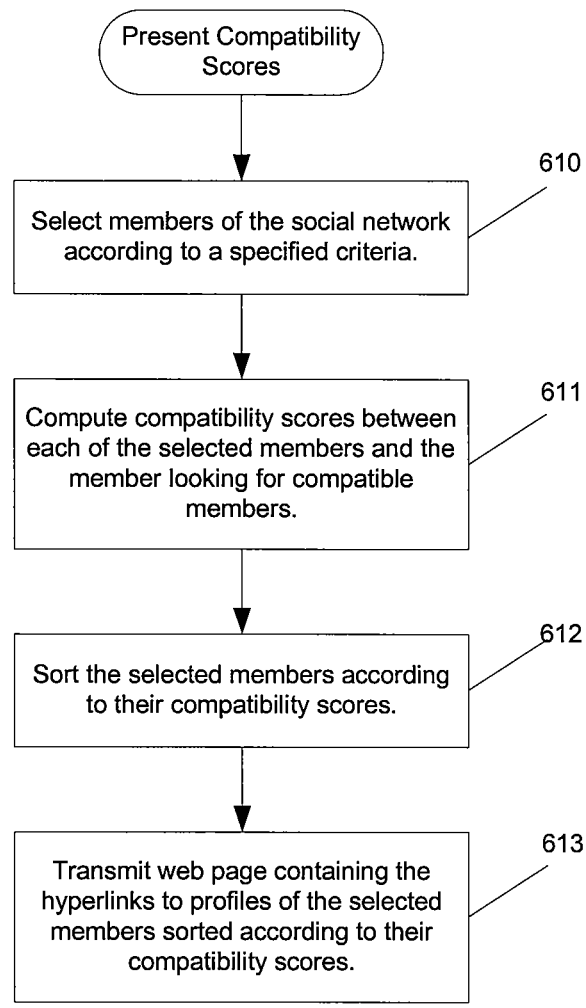
FIG. 6 is a flow diagram illustrating the process steps for generating a member search results page containing compatibility scores.

FIG. 6 is a flow diagram that illustrates the process steps executed by the processor of the application server 251 in presenting compatible scores of those members who meet a set of criteria specified by a member of the social network. In Step 610, the members of the social network who meet the specified criteria are selected. A sample graphical user interface (GUI) for specifying the set of criteria is illustrated in FIG. 7. The GUI 700 shows the criteria that can be specified by the member. They include: age, gender (men, women, men & women), location, purpose of the search, relationship status and keywords in selected categories such as hometown, companies, schools, affiliations, interests, favorite movies, favorite books, favorite music, and favorite TV shows. The GUI 700 also provides a setting for degree of separation (d/s): members who are within 1 d/s, members who are within 2 d/s, members who are within 3 d/s, or all members. After specifying the criteria, the member clicks on the search button 710, in response to which the application server 251 performs the search of the members who meet the specified criteria.

In Step 611, a compatibility score between the member specifying the criteria and each member of the social network who meets the specified search criteria is computed. In Step 612, the members of the social network who meet the specified search criteria are sorted according to their compatibility scores, and in Step 613, a web page containing images, mini-profiles, and hyperlinks associated with the members of the social network who meet the specified search criteria are transmitted to the member for display. The web page transmitted in Step 613 is formatted such that the images, mini-profiles, and hyperlinks associated with the members are displayed according their compatibility scores (highest to lowest). FIG. 8 shows a sample search results page 800.

The compatibility score between two members can be adjusted based on relationship information stored for the two members. In one embodiment, the compatibility score between the two members is increased based on the number of common first through Nth degree friends that the members have. N is typically set to 2 or 3, but may be any positive integer. The compatibility score may be increased in proportion to the number of common first through Nth degree friends that the members have, with the increase based on first degree friends being weighted higher than the increase based on second degree friends, and the increase based on second degree friends being weighted higher than the increase based on third degree friends, and so forth.

Figure 9:
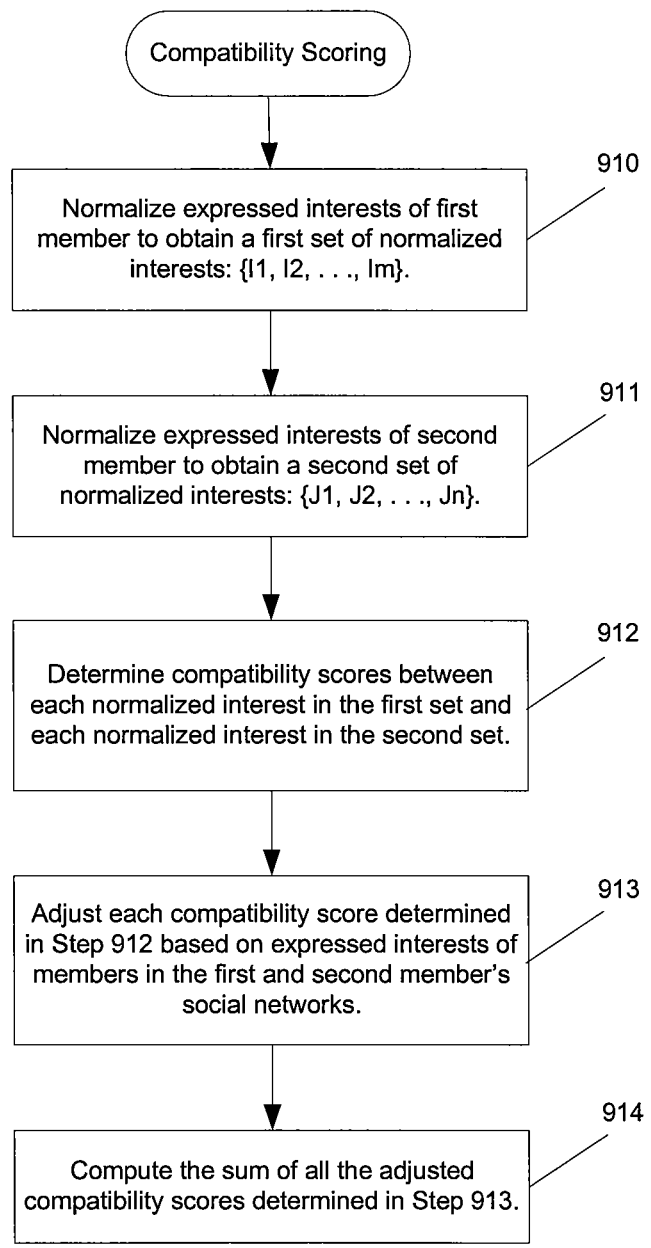
FIG. 9 is a flow diagram illustrating the process steps for computing a compatibility score between two members of a social network according to another embodiment of the present invention.

In another embodiment, the compatibility score between a first member of the social network and a second member of the social network is adjusted based on the commonality of the first member's expressed interest in the first member's social network and the commonality of the second member's expressed interest in the second member's social network. FIG. 9 is a flow diagram that illustrates the process steps executed by the processor of the application server 251 in computing a compatibility score between two members, e.g., a first member and a second member, with the adjustment based on the commonality of the first member's expressed interest in the first member's social network and the commonality of the second member's expressed interest in the second member's social network.

In Step 910, the expressed interests of the first member are normalized into a first set {I1, I2, . . . , Im} of normalized interests, where m represents the number of normalized interests in the first set. In Step 911, the expressed interests of the second member are normalized into a second set {J1, J2, . . . , Jn} of normalized interests, where n represents the number of normalized interests in the second set. In Step 912, the interest compatibility scores for all pairs of normalized interests in the first and second sets are determined from the matrix 320. For example, if the first set is {Interest_1, Interest_2} and the second set is {Interest_2, Interest_3}, the following compatibility scores are retrieved from the matrix 320:

Compatibility(Interest_1, Interest_2);
Compatibility(Interest_1, Interest_3);
Compatibility(Interest_2, Interest_2); and
Compatibility(Interest_2, Interest_3).

In Step 913, each of the compatibility scores determined in Step 912 is adjusted based on the commonality of the first member's expressed interest in the first member's social network and the commonality of the second member's expressed interest in the second member's social network. For example, the adjustments, k12, k13, k22, k23, are made to the compatibility scores determined in Step 912 as follows:

k12*Compatibility(Interest_1, Interest_2);
k13*Compatibility(Interest_1, Interest_3);
k22*Compatibility(Interest_2, Interest_2); and
k23*Compatibility(Interest_2, Interest_3).

The adjustment, kij, is a function of the number of first through Nth degree friends of the first member who have expressed an interest corresponding to Interest_i and the number of first through Nth degree friends of the second member who have expressed an interest corresponding to Interest_j. N is typically set to 3 or 4, but may be any positive integer. The properties of the adjustment, kij, are as follows:

1. kij.gtoreq.1;
2. kij=kji;
3. kij increases in proportion to the number of friends of the first member who have expressed an interest corresponding to Interest_i, with the amount of increase being weighted higher for closer degree friends; and
4. kij increases in proportion to the number of friends of the second member who have expressed an interest corresponding to Interest_j, with the amount of increase being weighted higher for closer degree friends.

In Step 914, the adjusted compatibility scores determined in Step 913 are summed, and the sum represents the compatibility score between the first member and the second member.

While particular embodiments according to the invention have been illustrated and described above, those skilled in the art understand that the invention can take a variety of forms and embodiments within the scope of the appended claims.

What is claimed is:

1. A method comprising:
  receiving search criteria from a first user of an online social network, the search criteria comprising one or more interests;
  selecting, using the one or more computer processors, one or more second users of the online social network who meet the search criteria, the selecting of each second user being based on:

(1) the one or more interests of the search criteria, and
(2) the interests of the second user,
estimating a probability of compatibility of each pair of interests, each pair including a first interest from the interests of the first user and a second interest from the interests of the second user;
calculating, for each second user, a total probability of compatibility score for all interests with respect to the first user; and
sending information associated with the one or more second users to the first user.

2. The method of claim 1, wherein the selecting is based on an interest compatibility score for each pair of interests.

3. The method of claim 2, wherein the interest compatibility score for a pair of interests is based on the estimated probability of compatibility calculated for the pair of interests divided by the product of the estimated probability of compatibility calculated for a first interest of the pair of interests and the estimated probability of compatibility calculated for a second interest of the pair of interests.

4. The method of claim 1, wherein the search criteria is received in relation to the online social network.

5. The method of claim 1, wherein the search criteria is received in relation to a third-party website, application, or web service.

6. The method of claim 1, wherein each of the one or more second users are connected to the first user within the online social network.

7. The method of claim 1, further comprising calculating an interest compatibility score between each pair of interests, the interest compatibility score for each pair of interests being based on the estimated probability of compatibility of the pair of interests.

8. The method of claim 1, wherein the search criteria is received from a client system of the first user.

9. The method of claim 7, further comprising determining one or more compatible interests, wherein each compatible interest has an interest compatibility score in relation to a first interest that exceeds a pre-determined threshold score.

10. The method of claim 9, wherein the selecting of each second user is further based on: (3) the one or more compatible interests.

11. The method of claim 1, wherein the sent information associated with the one or more second users comprises search results identifying one or more of the second users.

12. The method of claim 1, further comprising:
accessing a social graph comprising a plurality of nodes and a plurality of edges connecting the nodes, each of one or more of the nodes being associated with one of a plurality of users of an online social network, each connection between two nodes representing a relationship between the two nodes and establishing a single degree of separation between the two nodes.

13. The method of claim 12, wherein:
the first user is associated with a first node of the plurality of nodes; and
each second user is associated with a second node of the plurality of nodes.

14. The method of claim 13, wherein the selecting of each second user is further based on: (3) a degree of separation between the first user and the second user in the social graph.

15. The method of claim 1, further comprising normalizing the one or more interests received in the search criteria from the first user.

16. The method of claim 15, wherein normalizing the one or more interests comprises classifying each interest of the search criteria to a corresponding normalized interest, wherein each normalized interest corresponds to a plurality of interests.

17. The method of claim 1, wherein the estimated probability of compatibility of a pair of interests represents the probability that a user of the social network will express both interests of the pair of interests among the interests of the user.

18. The method of claim 1, wherein the interests of the first user comprise the interests received in the search criteria from the first user.

19. The method of claim 1, wherein the interests of the first user comprise one or more interests associated with a user profile of the first user.

20. The method of claim 1, wherein the sent information associated with the one or more second users comprises the calculated total probability of compatibility scores for the second users.

21. One or more computer-readable non-transitory storage media embodying logic that is operable when executed to:
receive search criteria from a first user of an online social network, the search criteria comprising one or more interests;
select one or more second users of the online social network who meet the search criteria, the selection of each second user being based on:
(1) the one or more interests of the search criteria, and
(2) the interests of the second user,
estimating a probability of compatibility of each pair of interests, each pair including a first interest from the interests of the first user and a second interest from the interests of the second user;
calculate, for each second user, a total probability of compatibility score for all interests with respect to the first user; and
send information associated with the one or more second users to the first user.

22. A system, comprising: one or more non-transitory machine-readable storage media encoded with instructions; and one or more processors operable to execute the instructions to:
receive search criteria from a first user of an online social network, the search criteria comprising one or more interests;
select one or more second users of the online social network who meet the search criteria, the selection of each second user being based on:
(1) the one or more interests of the search criteria, and
(2) the interests of the second user,
estimating a probability of compatibility of each pair of interests, each pair including a first interest from the interests of the first user and a second interest from the interests of the second user;
calculate, for each second user, a total probability of compatibility score for all interests with respect to the first user; and
send information associated with the one or more second users to the first user.

\* \* \* \* \*